(12) United States Patent
Whillock

(10) Patent No.: US 7,786,858 B2
(45) Date of Patent: Aug. 31, 2010

(54) VIDEO-ENABLED RAPID RESPONSE SYSTEM AND METHOD

(75) Inventor: Rand Whillock, North Oaks, MN (US)

(73) Assignee: Honeywell International Inc., Morristown, NJ (US)

( * ) Notice: Subject to any disclaimer, the term of this patent is extended or adjusted under 35 U.S.C. 154(b) by 276 days.

(21) Appl. No.: 11/952,739

(22) Filed: Dec. 7, 2007

(65) Prior Publication Data

US 2009/0146829 A1    Jun. 11, 2009

(51) Int. Cl.
*G08B 1/08* (2006.01)
(52) U.S. Cl. .................. 340/539.13; 340/539.12; 340/572.1; 340/825.49; 340/825.69
(58) Field of Classification Search ............ 340/539.12, 340/539.13, 572.1, 572.4, 573.1, 825.49, 340/825.69; 235/375, 376, 385; 382/115, 382/117; 713/185, 186
See application file for complete search history.

(56) References Cited

U.S. PATENT DOCUMENTS

| | | | |
|---|---|---|---|
| 6,783,459 B2 * | 8/2004 | Cumbers | 463/29 |
| 7,145,462 B2 | 12/2006 | Dewing et al. | 340/573.1 |
| 7,183,895 B2 | 2/2007 | Bazakos et al. | 340/5.7 |
| 7,244,231 B2 | 7/2007 | Dewing et al. | 600/300 |
| 7,394,380 B2 * | 7/2008 | Ballin et al. | 340/572.1 |
| 2004/0030531 A1 | 2/2004 | Miller et al. | 702/182 |
| 2004/0147817 A1 | 7/2004 | Dewing et al. | 600/300 |
| 2004/0212505 A1 | 10/2004 | Dewing et al. | 340/573.1 |
| 2007/0182544 A1 * | 8/2007 | Benson et al. | 340/521 |
| 2007/0198850 A1 | 8/2007 | Martin et al. | 713/186 |
| 2007/0206840 A1 | 9/2007 | Jacobson | 382/117 |
| 2007/0212023 A1 | 9/2007 | Whillock | 386/94 |

* cited by examiner

*Primary Examiner*—Hung T. Nguyen
(74) *Attorney, Agent, or Firm*—Kermit D. Lopez; Luis M. Ortiz; Kris T. Fredrick

(57) ABSTRACT

A video-enabled rapid response system and method that integrates identification technology and tracking technology in order to rapidly alert the most appropriate person to an incident. Such an approach includes a strong identification mechanism to get a positive identification on a person and a weak identification mechanism to maintain location information for the person moving in a facility. The system can rapidly determine the closest person with skills and or authority to respond when an incident occurs at a particular location and then pass an alert to them via a paging mechanism. The system combines strong and weak identification mechanism in order to provide accurate subject identification and tracking over the large facility.

20 Claims, 4 Drawing Sheets

VIDEO-ENABLED RAPID RESPONSE SYSTEM AND METHOD

TECHNICAL FIELD

Embodiments are generally related to data-processing methods and systems. Embodiments are also related to rapid incident response systems.

BACKGROUND OF THE INVENTION

Large facilities are typically subject to incidents and other events that need to be handled quickly by appropriate personnel. A number of systems have been utilized to permit notification to designated persons as first responders in the event of an emergency. It is common practice, for example, to increase incident response times by rapidly passing alert information to the closest person in a very large dynamic environment, such as a large facility, airport or shopping mall. The majority of applications require personnel to be free to move over a wide range of the facility. An example might be a large shopping mall with a security staff. The security people can patrol the facility, but when an incident occurs, it is important that the closest person to the incident or event respond quickly. Other examples might be custodians or sales people in a retail environment or medical personnel in a large hospital.

First responders are personnel who provide law enforcement, safety and protection services to the public. First responders include law enforcement officers such as police, sheriff, highway patrol, detectives, special law enforcement, FBI, DEA, military personnel, border patrol, and so forth. First responders also include fire and safety personnel, such as, for example, firefighters, emergency medical services personnel, Red Cross personnel, and other emergency workers.

The majority of prior art rapid response systems have limited communications capabilities. Adequate situational awareness is also lacking among first responder personnel and there is not a method for "knowing" the location of the various first responders at the incident scene. The lack of voice communications among the different groups of first responders means that there is no real location information available, and the only situational awareness even available is limited information generated by members of the same agency.

Typical methods utilized to maintain accountability of first response personnel are manual methods. In each of these manual methods, the usual procedure involves the use of some physical means of identifying whether a responder is present at the incident scene, and in some cases, identifying where the responder is assigned during the emergency. Because these methods are manual in nature, they do not provide a technique or approach for accurately accounting for all first responder personnel at an incident site; nor do such manual techniques provide ways to dynamically track the actual location or movement of first responder personnel around the incident site as the emergency unfolds. Consequently, incident command and control personnel do not possess detailed information regarding the location of the first responders and can quickly lose track of first responders.

This cascading effect typically results in slower response times to emergencies, less-than-optimal deployment, and a much higher level of risk for the first responders and the incident victims. Consequently, there is a need among first responders to be provided with an accountability of and interoperable communications among all responders at an incident site, as well as a high level of situational awareness in order to provide greater safety and increased efficiency in use of the resources at the incident scene.

Based on the foregoing it is believed that a need exists for an improved method and system method for determining the closest person with respect to an incident, and passing an alert message in an emergency situation within a defined area.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data-processing method and system.

It is another aspect of the present invention to provide for an improved rapid incident response system.

It is a further aspect of the present invention to provide for an improved method and system for determining the closest person to an incident or emergency, and passing alert messages in an emergency situation within a defined area.

The aforementioned aspects and other objectives and advantages can now be achieved as described herein. A video-enabled rapid response system and method that integrates identification technology and video tracking technology in order to rapidly alert a closest person to an incident. The system includes a strong identification mechanism utilizing identification technology to get a positive identification on a person and a weak identification mechanism utilizing video tracking technology to maintain location information for the person moving about a large facility. The disclosed system can rapidly determine the closest person with skills and or authority to respond when an incident occurs at a particular location and then pass an alert to them via an RF paging mechanism. The disclosed system combines strong and weak identification mechanism in order to provide accurate subject identification and tracking over the large facility.

The strong identification mechanism can uniquely identify a subject by matching to a long-term database of enrolled people. A number of technologies including RFID and biometrics can provide strong identification. The ID, appearance model and Most Recent Location (MRL) of the subject can be stored in a short-term database. The weak identification mechanism matches the subject between video camera sequences over a short period of time. When an incident occurs, the short-term database can be searched to find the closest appropriate person and then an alert can be passed to them via a paging mechanism. The weak identification mechanism can be utilized to determine whether it is the same person as seen in a previous scene or a different camera. The strong identification mechanisms typically are expensive and require some degree of subject cooperation and interaction, and can be used sparingly. The weak identification mechanisms can be done with standard video cameras, which are less expensive, cover greater areas and can be utilized for multiple applications such as surveillance.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
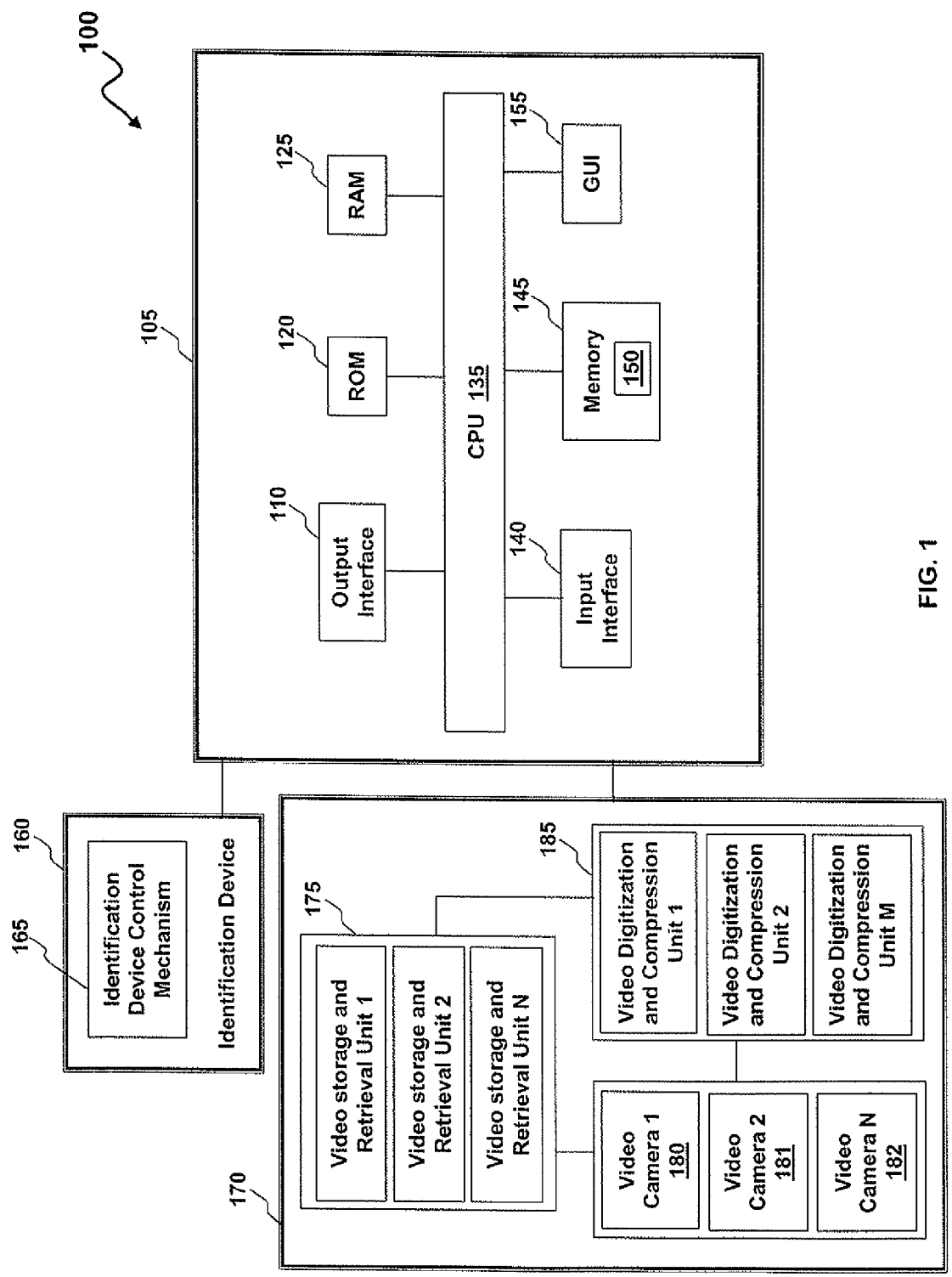
FIG. 1 illustrates a block diagram of a data-processing apparatus, which can be utilized for determining the closest person to an event and passing an alert message in an emergency situation, in accordance with a preferred embodiment.

Referring to the drawings and in particular to FIG. 1, there is depicted a data-processing system 100 which can be utilized for determining a closest person and passing an alert message in an emergency situation in accordance with a preferred embodiment. Data-processing system 100 represents one of many possible data-processing and/or computing devices, which can be utilized in accordance with the disclosed embodiments. It can be appreciated that data-processing system 100 and its components are presented for generally illustrative purposes only and do not constitute limiting features of the disclosed embodiments. The data-processing system 100 generally includes a data-processing apparatus 105, an identification device 160 and a video tracking subsystem 170.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

The data processing system 100 is essentially a computer that include an input interface 130 for receiving data, a CPU 135, a memory 145 including a read only memory (ROM) 120 and a random access memory (RAM) 125, and an output interface 110. Memory 145 can be implemented as a ROM 120, RAM 125, or a combination thereof, or simply a general memory unit. Module 150 can be stored within memory 145 and then retrieved and processed via processor 135 to perform a particular task. The input interface 140, such as a keyboard, mouse, or another pointing device, can be connected to CPU 135. One or more programs and data for identifying a subject are stored in the ROM 120. The ROM 120 may be a rewritable ROM such as an EPROM. Data information can be stored in a software module, for example a database in memory 145.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 150 depicted in FIG. 1.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as media storage or CD ROMs and transmission-type media such as analogue or digital communications links. The logical operation steps depicted in FIGS. 3-4 can, for example, be implemented in the context of such a software module.

The wireless identification device 160 includes a controller mechanism 165 for acquiring, processing and transmitting data signals. A number of technologies including RFID and biometrics can provide strong identification. An identification device 160 may be any type of device which is capable of identifying or providing characteristic information for a subject, including, for example, Radio Frequency Identification (RFID) tags. The identification device controller mechanism 165 may be in the form of a printed circuit board (PCB) or other processing unit or electronics structure. Further, the controller mechanism 165 is capable of acquiring data signals from an external source, processing data, storing data in a storage sub-component and/or transmitting data signals to an external system or network.

The video tracking subsystem 170 can be configured to automatically provide subject identification, appearance models and to maintain location information associated with a particular subject. In a preferred embodiment, the video tracking subsystem 170 can include the use of various video analysis algorithms. The data-processing device 105 processes digitized video with the various algorithms so as to automatically monitor a video image and identify and track subjects as they move from one video frame or scene to another. The video tracking subsystem 170 may identify subjects by accessing a database stored in the memory 145 of appearance models for known subjects. The image to be analyzed may be provided in real time from one or more cameras and/or from storage (e.g., memory).

The video tracking subsystem 170 includes multiple video cameras such as video camera 1, video camera 2 and video camera n, as indicated by reference numerals 180, 181 and 182 and video storage and retrieval units 175 which can be coupled to each other and to a multiple video digitization and compression units 185. The video cameras 180, 181 and 182 can provide real time video containing subjects to be identified. The video storage and retrieval units 175 may be, for example, a VCR, DVD, CD or hard disk unit. The video digitization and compression units 185 are generally coupled to a data-processing device 105 that is configured to automatically monitor video images and identify and track and subjects over time within a sequence of images. The digitization and compression units 185 can also convert analog video and audio into, for example, MPEG format, Real Player format, etc.

Note that the term "GUI" as utilized herein generally refers to a type of environment that represents programs, files, options and so forth by means of graphically displayed icons, menus, and dialog boxes on a computer monitor screen. A user can interact with the GUI 155 to select and activate such options by pointing and clicking with a user input device such as, for example, a pointing device such as a mouse, and/or with a keyboard. A particular item can function in the same manner to the user in all applications because the GUI 155 provides standard software routines (e.g., module 150) to handle these elements and reports the user's actions.

Figure 2:
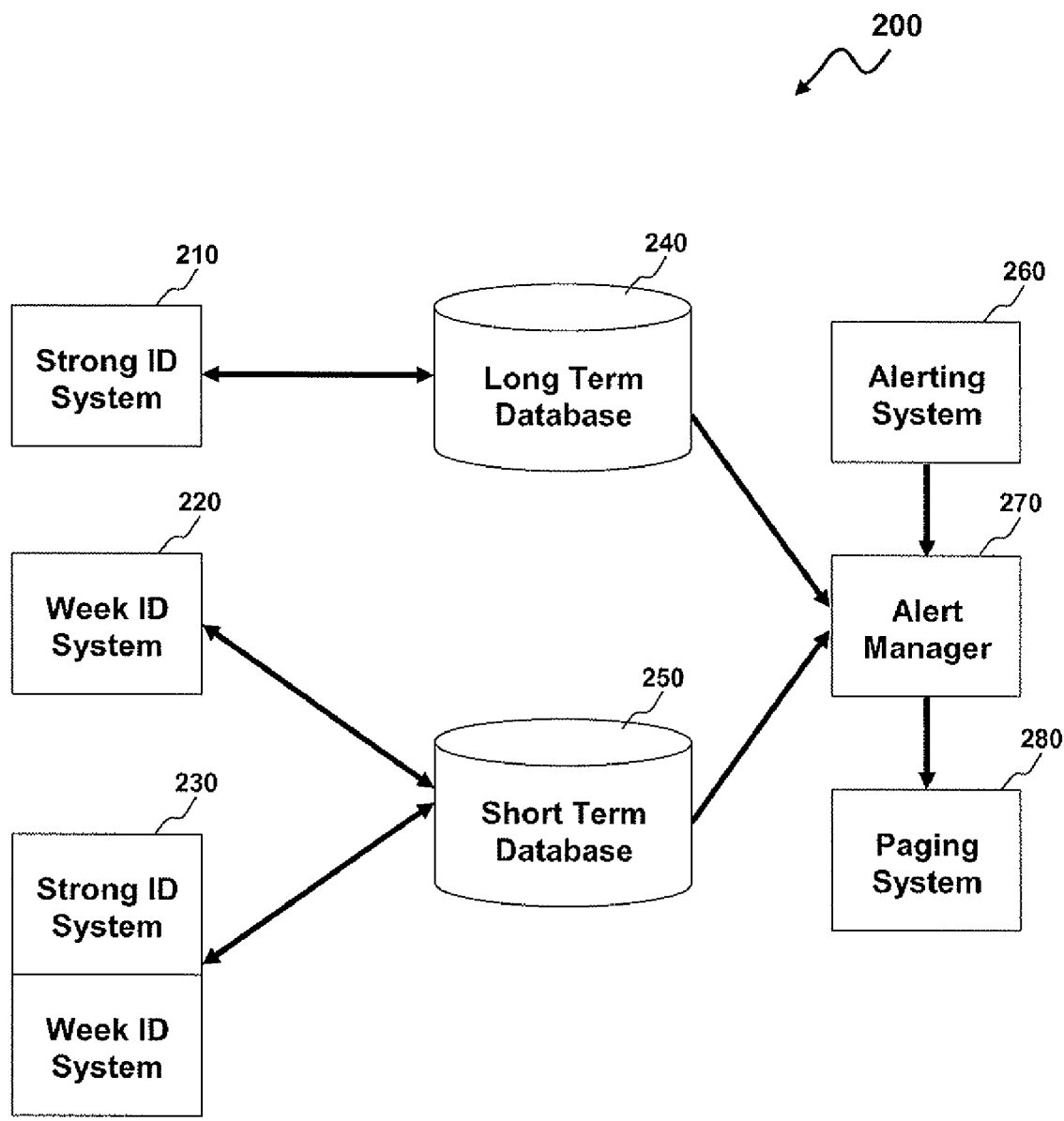
FIG. 2 illustrates a block diagram showing main components of a video-enabled rapid response system which can be implemented, in accordance with a preferred embodiment.

Referring to FIG. 2, a block diagram is illustrated depicting the main components of a video-enabled rapid response system 200, in accordance with a preferred embodiment. The video-enabled rapid response system 200 generally includes a strong identification mechanism 210 and a weak identification mechanism 220. However, as indicated above the video-enabled rapid response system 200 can be similarly configured for use in any of a number of surveillance or other applications. For example, the system 200 can be applied to various situations in which tracking moving subjects is needed. One such situation is security surveillance in public areas such as airports, military bases, home security systems, and so forth. The system 200 can also be utilized to automatically identify and notify proper individuals (e.g., sales people in a retail environment, medical personnel in a large hospital, etc.).

The wireless identification device 160 depicted in FIG. 1 can be utilized, for example, to implement the strong identification mechanism 210. The strong identification mechanism 210 further includes a long term database 240, which stores strong ID features, true identities and authorizations of a subject. For example, during a training procedure, one or more wireless tag IDs can be stored by the rapid response system 200 and, optionally, associated with specific users, such as by their name or employee number. Note that various security protocols may be implemented where specific users are allowed to access only certain portions of a building, such as rooms or floors. When the strong identification mechanism identifies a subject the weak identification mechanism 220 can, in parallel, compute a short-term appearance model to represent how a subject appears on a particular occasion.

The ID and appearance model can be stored in a short-term database 250. The Most Recent Location (MRL) of the subject can also be stored in the short-term database 250. A facility can then be covered by the weak identification mechanism 220 such as a video-tracking subsystem 170 as illustrated in FIG. 1. One or more separated systems 230 can be formed by combing the strong identification mechanism 210 and the weak identification mechanism 220. When subjects are seen by the weak identification mechanism 220, their features are compared to appearance models stored in the short-term database 250 in order to get a match. If a match is found, the MRL (Most Recent Location) can be updated for the subject. Hence, the subject's location can be tracked throughout the facility.

When an incident occurs, the short-term database 250 can be searched to find the closest appropriate person and then an alerting system 260 can pass an alert signal to a paging mechanism 280 through an alert manager 270. The strong identification 210 can uniquely identify an individual by matching to the long-term database 240 of enrolled people. The weak identification mechanism 220 can be utilized to determine the appearance model of the subject as seen in a previous scene or a different camera. The alerting system 260 receives the ID features from the long-term database 240 and the updated most recent location from the short-term database 250. The system 200 can also be configured to alert a number of close people depending on the type of need.

Figure 3:
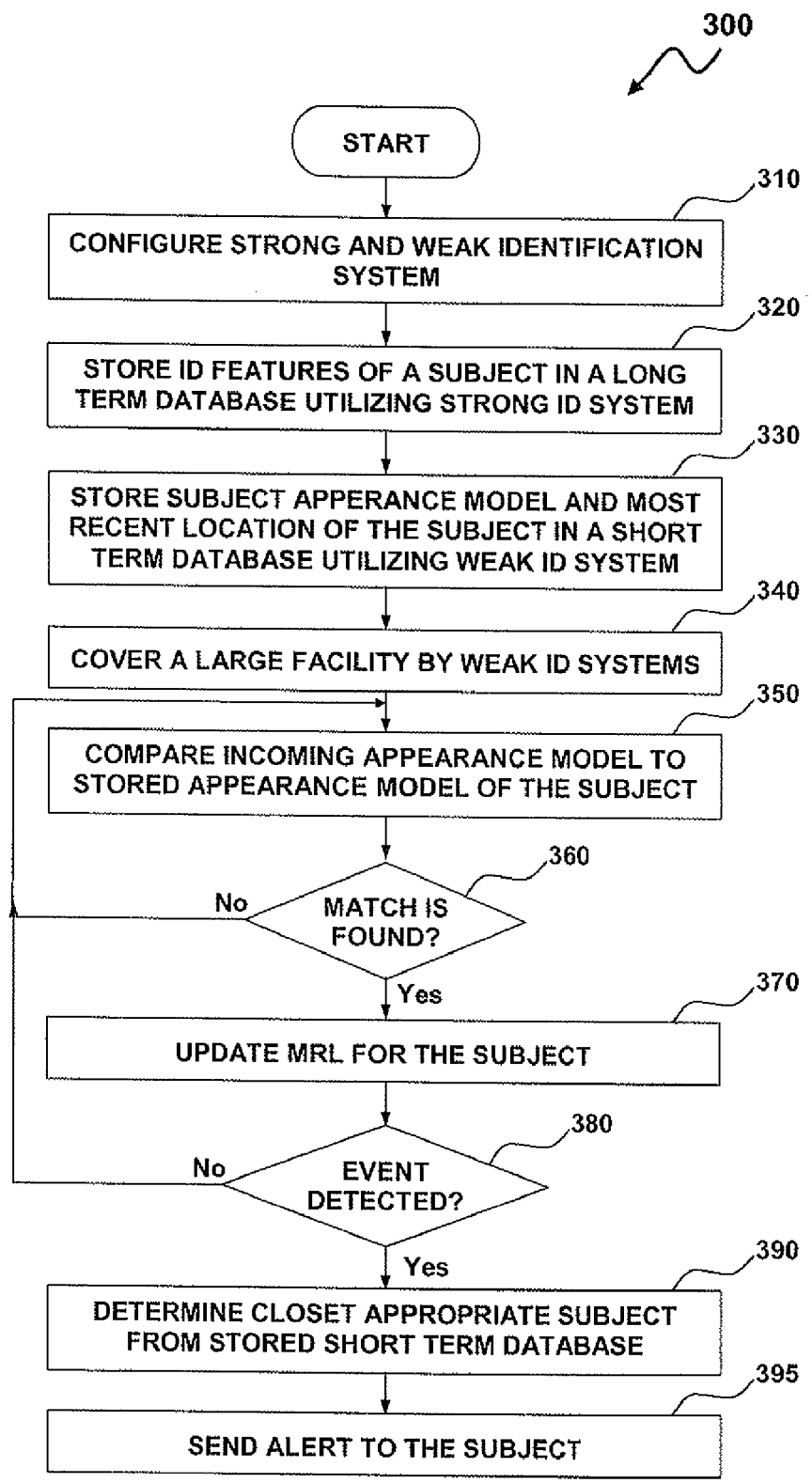
FIG. 3 illustrates a high level flow chart of operations illustrating logical operational steps of a method for determining the closest person to an event and passing an alert message in an emergency situation, in accordance with a preferred embodiment.

Referring to FIG. 3, a high level flow chart of operations depicting logical operational steps of a method 300 for determining the closest person to an incident and passing an alert message in an emergency situation is illustrated, in accordance with a preferred embodiment. Note that the method 300 indicated in FIG. 3 can be implemented in the context of a software module such as, for example, the module 150 of data-processing apparatus 105 depicted in FIG. 1. The strong ID system 210 and the weak ID system 220 can be configured, as depicted at block 310. Thereafter, as indicated at block 320, identification features of a subject can be stored in a long-term database 240 utilizing strong ID system 210. The subject appearance model and most recent location of the subject can be stored in a short term database 250 utilizing weak ID system 220, as shown at block 330.

Next, as described at block 340, a large facility can be covered by the weak ID system 220. The weak ID system 220 can be configured as the video tracking subsystem 170 as depicted in FIG. 1. The incoming appearance model can be compared to stored appearance model of the subject, as depicted at block 350. In operation, in the video analysis mode the system 200 may receive incoming video images from the video cameras 180, 181 and 182 in real time, pre-recorded from the video storage and retrieval units 175 and/or a memory integral to the data-processing apparatus 105. A determination can be made whether a match is found, as depicted at block 360. If a match is found the most recent location for the subject can be updated in the short-term database 250, as shown at block 370. Otherwise, the process can be continued to step 350. Next, as depicted at block 380, a determination can be made whether an event can be detected. If an event is detected the closest appropriated subject can be determined from stored short-term database 250, as shown at block 390. An alert can be sent to the appropriate subject, as depicted at block 395, Otherwise, the process can be continued to step 350.

Figure 4:
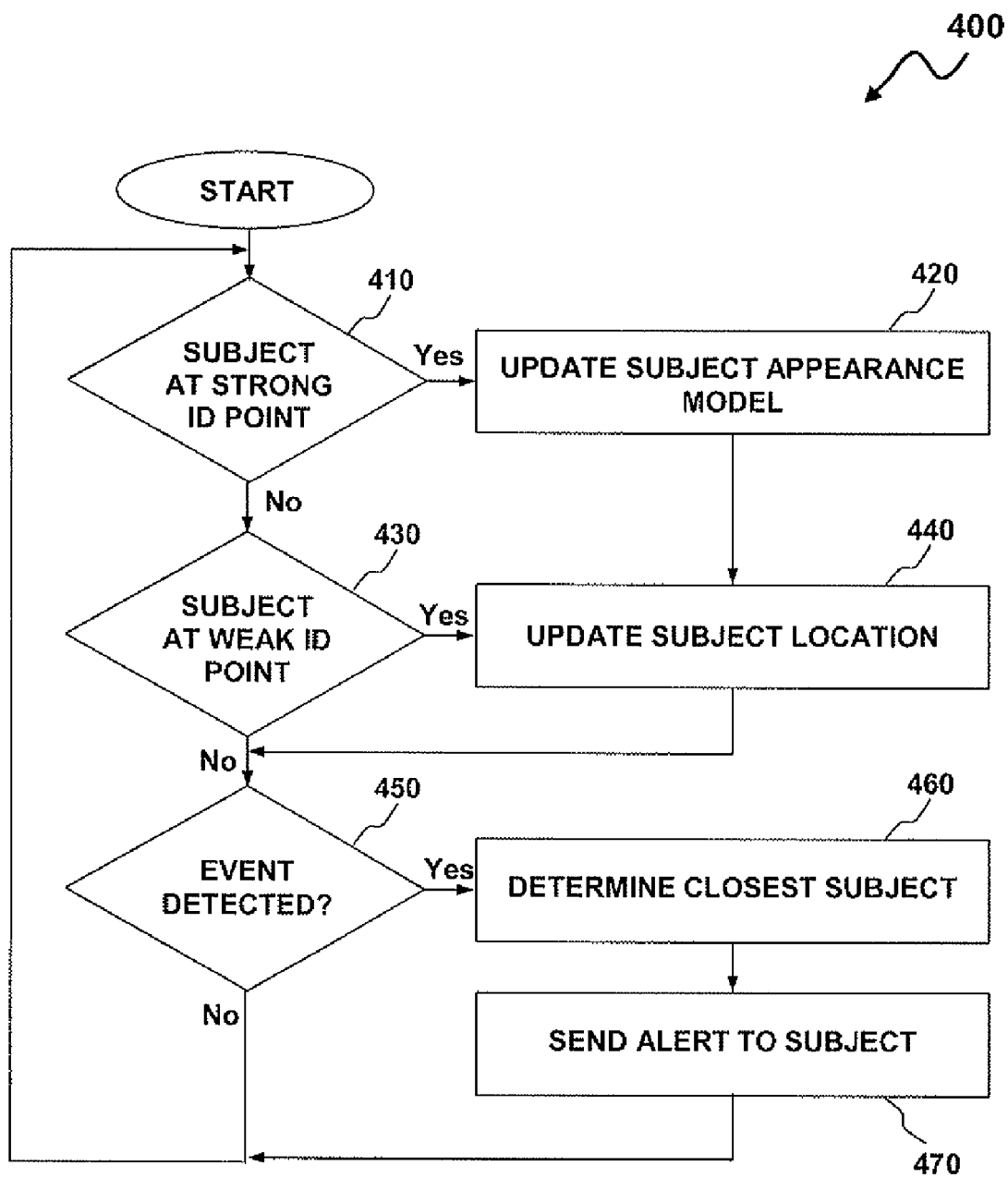
FIG. 4 illustrates a detailed flow chart of operations illustrating logical operational steps of a method for determining the closest person to an event and passing an alert message in an emergency situation using strong and weak identification mechanism, in accordance with a preferred embodiment.

Referring to FIG. 4, a detailed flow chart of operations illustrating logical operational steps of a method 400 for determining the closest person to an incident and passing an alert message in an emergency situation using the identification mechanisms 210 and 220 is illustrated, in accordance with a preferred embodiment. Note that the method 400 depicted in FIG. 4 can be implemented in the context of a software module such as, for example, the module 150 of data-processing apparatus 105 depicted in FIG. 1.

A determination can be made whether a subject is at a strong identification point, as depicted at block 410. If the subject is at strong ID point the subject appearance model and the subject location can be updated, as shown at block 420. Otherwise, a determination can be made whether a subject is at a weak identification point, as indicated at block 430. If the subject is at weak ID point the subject location can be updated, as shown at block 440. Next, as depicted at block 450, a determination can be made whether an event can be detected. If an event is detected the closet subject can be determined and an alert can be sent to the subject, as depicted at blocks 460 and 470. Otherwise, the process can be continued to block 410.

Based on the foregoing it can be appreciated that the system 200 can be provided, through the use of one or more software modules as described above, which results for rapidly alerting a closest person to an incident. The strong ID system 210 typically is more expensive and requires some degree of subject cooperation and interaction, so they can be utilized sparingly. The weak identification mechanism 220 can be done with standard video cameras, which are less expensive, cover greater areas and can be used for multiple applications such as surveillance. The video-enabled rapid response system 200 can combine the strong ID system 210 and weak ID system 220 and can provide accurate subject identification and tracking over large areas. The system 200 can rapidly determine the closest person with skills and or authority to respond and then pass an alert to them via an RF paging mechanism 280 when an incident occurs at a particular location. The system 200 can also be configured to alert a number of people depending on the type of need.

It is believed that by utilizing the system and approach described herein, the incident response time can be decreased rapidly by passing alert information to the closet person or the first responder. The system described herein also can be adapted for use for non-emergency/alert applications where there is still a need to dispatch appropriate personnel to a location in a dynamic environment. A typical such application would dispatch security personnel to an incident in a large office building or sales personnel to a customer in a large retail establishment.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A rapid response system, comprising:
   a strong identification mechanism having an identification capability, wherein said strong identification mechanism is capable of obtaining a positive identification of a subject and uniquely identifying said subject by matching data associated with said subject against a long-term database of a plurality of enrolled subjects;
   a weak identification mechanism associated with said strong identification mechanism, where said weak identification mechanism includes a tracking capability for covering a facility in order to maintain within a short-term database, a most recent location of said subject; and
   a response determination mechanism that communicates with said short-term database to determine a closest appropriate subject to a desired location based on data contained in said short-term database in association with said strong identification mechanism and said weak identification mechanism.

2. The system of claim 1 further comprising:
   a transmission mechanism for transmitting a message to said closest appropriate subject associated with and in communication with said response determination mechanism, said weak identification mechanism and said strong identification mechanism.

3. The system of claim 1 wherein said strong identification mechanism comprises an access control component.

4. The system of claim 3 wherein said access control component comprises an ID card that identified said subject.

5. The system of claim 3 wherein said access control component comprises a PIN (Personal Identification Number) that identifies said subject.

6. The system of claim 1 wherein said strong identification mechanism comprises a biometric identification component that utilizes at least one biometric identifier and an RFID identifier that determines the identity of said subject.

7. The system of claim 1 wherein said weak identification mechanism comprises at least one video camera subject to an associated video processing algorithm that assists in tracking said subject in a facility based on an appearance of said subject captured by said at least one video camera.

8. The system of claim 2 wherein said transmission mechanism for transmitting a message comprises an intercom or an RF (Radio Frequency) based paging system.

9. The system of claim 1 wherein said response determination mechanism determines a desired location to send said subject based on an external event or a particular alert.

10. The system of claim 9 wherein said alert comprises a trigger of a security alarm.

11. The system of claim 9 wherein said alert comprises an activation of a customer call button.

12. The system of claim 1 wherein said response determination mechanism further determines a closest appropriate subject based on a location of said subject, a qualification of said subject, said event type, and said event location.

13. The system of claim 1 wherein said strong identification mechanism and said weak identification mechanism together provide an accurate identification and tracking of said subject over within a facility.

14. The system of claim 11 wherein said facility includes at least one of the following: a government building, an office complex, a public gathering place, a parking structure, a stadium, an entertainment facility, a factory, a retail complex, a shopping mall, a casino, a building complex, a park, a hospital or an urban area.

15. A video-enabled rapid response system, comprising:
   a strong identification mechanism having an identification capability, wherein said strong identification mechanism is capable of obtaining a positive identification of a subject and uniquely identifying said subject within a facility by matching data associated with said subject against a long-term database of a plurality of enrolled subjects;
   a weak identification mechanism associated with said strong identification mechanism, where said weak identification mechanism includes a video tracking capability for covering said facility in order to maintain within a short-term database, an appearance model of said subject and a most recent location information of said subject; and
   an alert mechanism for determining a closest appropriate subject associated with said short-term database and transmitting an alert message to said closest appropriate subject for enabling a response to at least one detected event, said alert mechanism associated with and in communication with said weak identification mechanism and said strong identification mechanism.

16. A rapid response method, comprising:
   providing a strong identification mechanism having an identification capability, wherein said strong identification mechanism is capable of obtaining a positive identification of a subject and uniquely identifying said subject by matching data associated with said subject against a long-term database of a plurality of enrolled subjects;
   associating a weak identification mechanism with said strong identification mechanism, wherein said weak identification mechanism includes a tracking capability for covering a facility in order to maintain within a short-term database, a most recent location of said subject; and providing a response determination mechanism that communicates with said short-term database to determine a closest appropriate subject to a desired location based on data contained in said short-term database in association with said strong identification mechanism and said weak identification mechanism.

17. The method of claim 16 further comprising:
providing a transmission mechanism for transmitting a message to said closest appropriate subject associated with and in communication with said response determination mechanism, said weak identification mechanism and said strong identification mechanism.

18. The method of claim 16 wherein said strong identification mechanism comprises an access control component.

19. The method of claim 16 further comprising modifying said weak identification mechanism to include at least one video camera subject to an associated video processing algorithm that assists in tracking said subject in a facility based on an appearance of said subject captured by said at least one video camera.

20. The method of claim 16 wherein said response determination mechanism determines a desired location to send said subject based on an external event or a particular alert.

* * * * *